United States Patent
Murgia

(10) Patent No.: US 10,498,658 B2
(45) Date of Patent: Dec. 3, 2019

(54) SYSTEMS AND METHODS FOR FIRST PACKET APPLICATION CLASSIFICATION

(71) Applicant: Citrix Systems, Inc., Fort Lauderdale, FL (US)

(72) Inventor: Marco Antonio Murgia, Los Gatos, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 88 days.

(21) Appl. No.: 15/790,410

(22) Filed: Oct. 23, 2017

(65) Prior Publication Data

US 2019/0124010 A1  Apr. 25, 2019

(51) Int. Cl.
| | |
|---|---|
| *H04L 12/28* | (2006.01) |
| *H04L 12/813* | (2013.01) |
| *H04L 12/851* | (2013.01) |
| *H04L 12/26* | (2006.01) |
| *H04L 29/08* | (2006.01) |
| *H04L 29/06* | (2006.01) |

(52) U.S. Cl.
CPC ............ *H04L 47/20* (2013.01); *H04L 43/028* (2013.01); *H04L 47/2441* (2013.01); *H04L 67/322* (2013.01); *H04L 69/22* (2013.01)

(58) Field of Classification Search
CPC ......... H04L 45/34; H04L 69/22; H04L 47/20; H04L 43/028; H04L 47/2441
See application file for complete search history.

(56) References Cited

U.S. PATENT DOCUMENTS

| | | | |
|---|---|---|---|
| 8,813,236 B1 * | 8/2014 | Saha | H04L 63/1408 726/22 |
| 8,903,749 B2 | 12/2014 | Dubois et al. | |
| 2007/0160079 A1 * | 7/2007 | Han | H04L 41/0893 370/465 |

(Continued)

OTHER PUBLICATIONS

International Search Report and Written Opinion for Int. Appl. No. PCT/US2018/054997, dated Jan. 14, 2019.

(Continued)

*Primary Examiner* — Minh Trang T Nguyen
(74) *Attorney, Agent, or Firm* — Foley & Lardner LLP; Christopher J. McKenna

(57) ABSTRACT

Described embodiments provide for low-latency classification of flows, via an intelligent learning-based system. In one implementation, a packet processor may utilize destination internet protocol (IP) addresses and domains identified in first packets of flows to determine if a similar flow has been previously received, directed to the same address and domain, or apply default routing and policy rules if not. The packet processor may subsequently fully classify the flow; generate a record in an association database for the combination of application, address, and domain, and a starting confidence level; and apply proper routing and policy rules. A subsequent flow for the same application and destination IP address may then be classified as the same as the prior flow, with corresponding routing and policy rules applied. The packet processor may continue to fully classify the flow, and upon full classification, the database entry may be updated and the confidence level adjusted.

21 Claims, 5 Drawing Sheets

(56) References Cited

U.S. PATENT DOCUMENTS

2011/0040706 A1* 2/2011 Sen .................. G06N 20/00
706/12
2018/0227223 A1* 8/2018 Hughes .................. H04L 69/22

OTHER PUBLICATIONS

Jun Li, et al., "Composite lightweight traffic classification system for network management", International Journal of Network Management, Wiley, GB, vol. 20, No. 2, Mar. 1, 2010 (Mar. 1, 2010), pp. 85-105, XP002617616, ISSN: 1055-7148, DOI: 10.1002/NEM.735 [retrieved on Feb. 22, 2010], pp. 1-8.

* cited by examiner

| Association Database 150 ||||| 
|---|---|---|---|---|
| Index 152 | Address 122 | Domain 106 | Application 124 | Score 154 |
| 0001 | 1.2.3.4:80 | example.com | Web server | 80 |
| 0002 | 1.2.3.4:22 | example.com | SSH | 90 |
| 0003 | 5.6.7.8:25 | example.com | Mail | 40 |
| 0004 | 5.6.7.8:25 | example.org | Mail | 70 |

*FIG. 1C*

SYSTEMS AND METHODS FOR FIRST PACKET APPLICATION CLASSIFICATION

FIELD OF THE DISCLOSURE

The present application generally relates to low-latency classification of network packets.

BACKGROUND OF THE DISCLOSURE

Network communications or flows between endpoints may be classified, e.g. by application, so that routing and quality of service (QoS) policies may be applied. For example, a first flow may be classified as real time video or voice over Internet protocol (VoIP) traffic, and receive higher priority routing and QoS; and a second flow may be classified as email traffic, and receive lower priority routing and QoS. This helps balance network bandwidth among different services and applications, to meet the needs of each service.

It may be important in many implementations to classify the first packet of a flow or communication, so that network paths may be properly selected and intermediary devices may be properly configured. However, classifying packets may require deep packet inspection (DPI) or other analysis functions that may add significant latency to communications. For example, in some implementations, DPI may not be completed until the flow has been established between the endpoint devices (and between various intermediary devices, including network address translation (NAT) devices, firewalls, etc.), particularly in implementations in which the first packet of a communication may include limited information (e.g. a transport control protocol synchronization packet (TCP SYN) which may not necessarily include a payload above OSI layer 4 (the transport layer)), making it difficult to identify applications. It may be difficult or impossible to change flow parameters or paths (e.g. to utilize different intermediary devices) after the flow is established, even if the DPI results indicate that the flow should be configured differently. Conversely, delaying establishment of the flow or buffering packets until full classification may be performed may result in long startup times for communications or transactions, frustrating users and delaying further processing tasks.

BRIEF SUMMARY OF THE DISCLOSURE

The systems and methods discussed herein provide for low-latency application classification of first packets of flows, via an intelligent learning-based system. In one implementation, a packet processor may utilize destination internet protocol (IP) addresses and domains identified in first packets of flows to determine if a similar flow has been previously received, directed to the same address and domain. If not, then default routing and policy rules may be applied to the flow. The packet processor may subsequently fully classify the flow and generate a record in an association database for the combination of application, address, port, and protocol number, and domain, along with a starting confidence level or probability. Once fully classified, proper routing and policy rules may be applied. A subsequent flow for the same application, with the same destination IP address, may then be classified as the same as the prior flow, with the corresponding routing and policy rules applied. The packet processor may continue to fully classify the flow via deep packet inspection or similar methods, and upon full classification, the database entry may be updated with a success or failure to match, including adjusting the confidence level or probability that the entry is correct.

In one aspect, the present disclosure is directed to a method for processing packet flows. The method includes receiving, by a packet processor, a first packet of a first flow to a first destination address associated with a first domain. The method also includes identifying, by the packet processor, a stored association between a first application, the first destination address, and the first domain. The method further includes selecting, by the packet processor, a first routing policy corresponding to the first application from a plurality of routing policies, responsive to the identification of the stored association between the first application, the first destination address, and the first domain. The method also includes processing, by the packet processor, the first packet of the first flow according to the selected first routing policy, responsive to the identification of the stored association between the first application, the first destination address, and the first domain.

In some implementations, the method includes subsequently classifying the first flow as corresponding to the first application; and increasing a first confidence score for the association between the first application, the first destination address, and the first domain, responsive to classifying the first flow as corresponding to the first application. In some implementations, the method includes subsequently classifying the first flow as corresponding to a second application different from the first application; and processing the first flow according to a second routing policy corresponding to the second application. In a further implementation, the method includes decreasing a first confidence score for the association between the first application, the first destination address, and the first domain, responsive to classifying the first flow as corresponding to the second application.

In some implementations, the method includes selecting the first routing policy by: determining that a first confidence score for the association between the first application, the first destination address, and the first domain exceeds a first threshold. In some implementations, the method includes, prior to receipt of the first packet of the first flow: receiving, by the packet processor, a first packet of an earlier flow to the first destination address associated with the first domain; determining, by the packet processor, that no association exists in an application database with the first destination address and the first domain; and processing, by the packet processor, the first packet of the earlier flow according to a default routing policy, responsive to the determination that no association exists in the application database with the first destination address and the first domain. In a further implementation, the method includes, prior to receipt of the first packet of the first flow and after processing the first packet of the earlier flow according to the default routing policy: classifying, by the packet processor, the earlier flow as corresponding to the first application associated with the first routing policy different from the default routing policy; and storing, by the packet processor, the association between the first application, the first destination address, and the first domain, and storing a first confidence score for the association.

In some implementations, the method includes receiving, by the packet processor, a first packet of a second flow to a second destination address associated with the first domain; identifying, by the packet processor, a stored association between a second application, the second destination address, and the first domain; selecting, by the packet processor, a second routing policy corresponding to the second application from the plurality of routing policies, responsive to the identification of the stored association between the second application, the second destination address, and the first domain; and processing, by the packet processor, the first packet of the second flow according to the selected second routing policy, responsive to the identification of the stored association between the second application, the second destination address, and the first domain. In some implementations, the first packet comprises an identification of a destination port and protocol; and identifying the stored association further includes identifying the stored association between the first application, the first destination address, the first domain, the destination port, and the protocol.

In another aspect, the present application is directed to a method for maintaining a database of application-address-domain associations. The method includes identifying a stored association between a first application, a first destination address, and a first domain, by a packet processor of a device, responsive to receipt of a first packet identifying the first destination address and first domain; extracting an application identifier from the first packet, by the packet processor; and adjusting a confidence score for the association between the first application, the first destination address, and the first domain, by the packet processor, based on the extracted application identifier. In some implementations, adjusting the confidence score further includes increasing the confidence score, by the packet processor, responsive to the extracted application identifier corresponding to the first application. In some implementations, adjusting the confidence score further includes decreasing the confidence score, by the packet processor, responsive to the extracted application identifier corresponding to a second application different from the first application. In some implementations, the method includes receiving, by the packet processor, a first packet of a subsequent flow to the first destination address associated with the first domain; determining, by the packet processor, that the confidence score for the association between the first application, the first destination address, and the first domain is below a threshold; and processing, by the packet processor, the first packet of the subsequent flow according to a default routing policy, responsive to the determination.

In still another aspect, the present application is directed to a system for processing packet flows. The system includes a packet processor deployed as an intermediary between a first device, and a second device at a first destination address and associated with a first domain; and a storage unit storing a database of associations between applications, destination addresses, and domains, and a confidence score for each said association. The packet processor is configured to: receive, from the first device, a first packet of a first flow to the second device at the first destination address associated with the first domain; and identify, in the database, a stored association between a first application, the first destination address, and the first domain. The packet processor is also configured to select a first routing policy corresponding to the first application from a plurality of routing policies, responsive to the identification of the stored association between the first application, the first destination address, and the first domain. The packet processor is also configured to process the first packet of the first flow according to the selected first routing policy, responsive to the identification of the stored association between the first application, the first destination address, and the first domain.

In some implementations, the packet processor is further configured to: subsequently classify the first flow as corresponding to the first application; and increase a first confidence score for the association between the first application, the first destination address, and the first domain, responsive to classifying the first flow as corresponding to the first application.

In some implementations, the packet processor is further configured to: subsequently classify the first flow as corresponding to a second application different from the first application; and process the first flow according to a second routing policy corresponding to the second application. In a further implementation, the packet processor is further configured to: decrease a first confidence score for the association between the first application, the first destination address, and the first domain, responsive to classifying the first flow as corresponding to the second application.

In some implementations, the packet processor is further configured to determine that a first confidence score for the association between the first application, the first destination address, and the first domain exceeds a first threshold; and selecting the first routing policy is performed responsive to the determination.

In some implementations, the packet processor is further configured to, prior to receipt of the first packet of the first flow: receive a first packet of an earlier flow to the first destination address associated with the first domain; determine that no association exists in an application database with the first destination address and the first domain; and process the first packet of the earlier flow according to a default routing policy, responsive to the determination that no association exists in the application database with the first destination address and the first domain. In a further implementation, the packet processor is further configured to, prior to receipt of the first packet of the first flow and after processing the first packet of the earlier flow according to the default routing policy: classify the earlier flow as corresponding to the first application associated with the first routing policy different from the default routing policy; and store, in the database, the association between the first application, the first destination address, and the first domain, and a first confidence score for the association.

In some implementations, the packet processor is further configured to: receive a first packet of a second flow to a second destination address associated with the first domain; identify a stored association between a second application, the second destination address, and the first domain; select a second routing policy corresponding to the second application from the plurality of routing policies, responsive to the identification of the stored association between the second application, the second destination address, and the first domain; and process the first packet of the second flow according to the selected second routing policy, responsive to the identification of the stored association between the second application, the second destination address, and the first domain.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 1C is an illustration of an embodiment of an association database for first packet application classification;

Figure 1A:
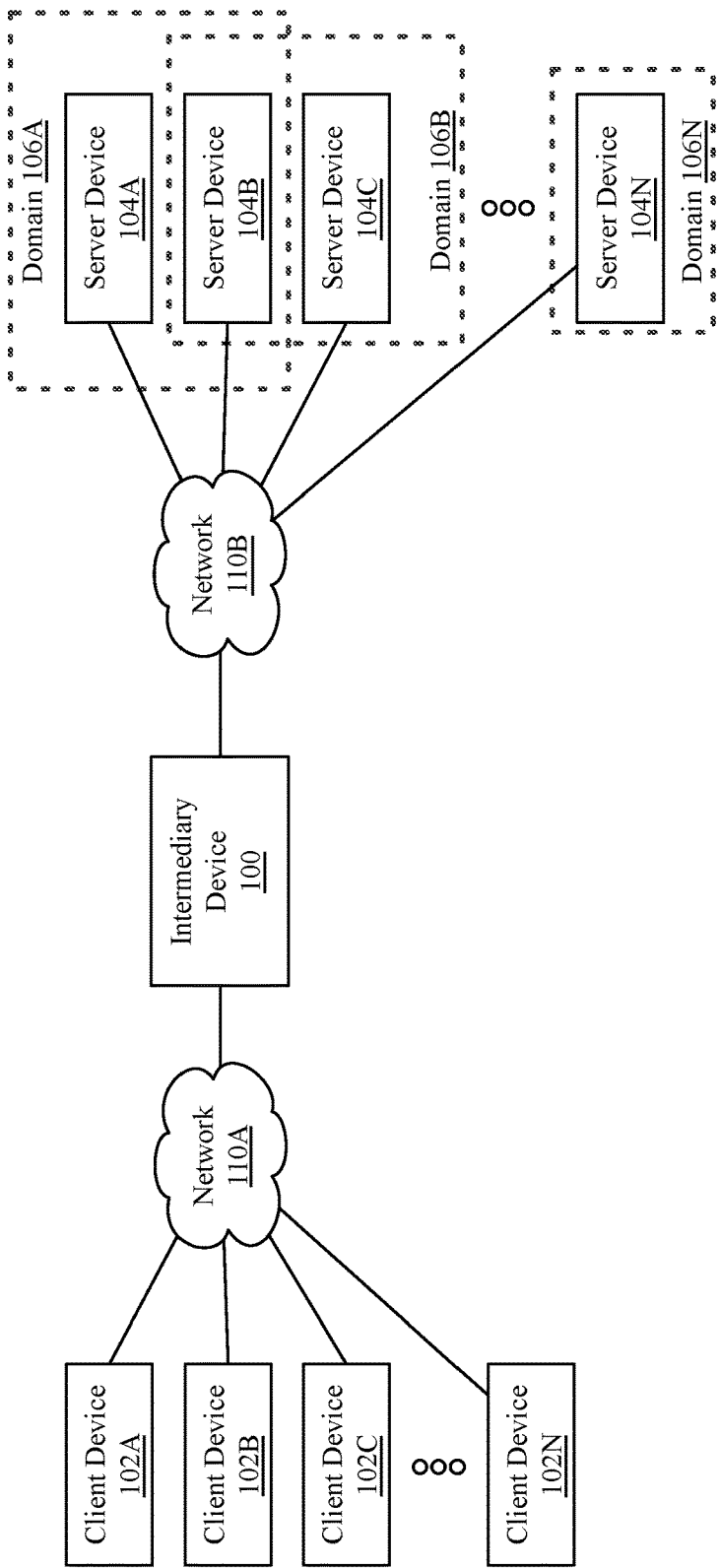
FIG. 1A is a block diagram illustrating an embodiment of a networking environment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Network communications or flows between endpoints may be classified, e.g. by application, so that routing and quality of service (QoS) policies may be applied. For example, a first flow may be classified as real time video or voice over Internet protocol (VoIP) traffic, and receive higher priority routing and QoS; and a second flow may be classified as email traffic, and receive lower priority routing and QoS. This helps balance network bandwidth among different services and applications, to meet the needs of each service.

For example, FIG. 1A is a block diagram illustrating an embodiment of a networking environment, including one or more client devices 102A-102N (referred to generally as client device(s) 102) in communication with one or more server devices 104A-104N (referred to generally as server device(s) 104), via one or more networks 110 (referred to generally as network(s) 110). Although shown with clients and servers in distinct groups, in many implementations, clients may communicate with other clients, and servers may communicate with other servers. Clients 102 and servers 104 may comprise any type and form of computing device, including desktop computers, laptop computers, tablet computers, wearable computers, embedded computers, rackmount computers, blade servers, intelligent appliances, Internet-of-Things (IoT) devices, or any other type and form of computing device. Clients 102 and/or servers 104 may include physical computing devices, and/or virtual computing devices executed by one or more physical computing devices. Clients 102 and/or servers 104 may include clusters, farms, or clouds of physical and/or virtual computing devices.

Intermediary device 100 may comprise a computing device for communicate packets between endpoints of a communication or "flow", such as client devices 102 and/or server devices 104. A flow, sometimes referred to as a traffic flow, packet flow, network flow, transaction, or by similar terms, may comprise a sequence of packets between computing devices. In some implementations, a flow may be unidirectional (e.g. client to server, or vice versa), while in other implementations, a flow may include bidirectional communication (e.g. requests and responses, transmissions and acknowledgments, etc.). Intermediary device 100 may provide additional processing for the flow, including routing, load balancing, acceleration, compression, encryption, multiplexing, connection pooling, caching, buffering, network address translation, firewalling, or any other network, communications, or security features or processing, or other such functions. Intermediary device 100 may be referred to as an appliance, gateway, NAT device, security device, router, switch, access point, modem, firewall, or any other such term. Intermediary device 100 may connection to a plurality of networks 100, and may process a plurality of packet flows via networks 100, providing QoS features such as buffering and priority-based balancing or re-ordering, congestion or traffic control, or any other such features.

Networks 110 may comprise any type and form of network for allowing clients and/or servers to communicate, including local area networks (LANs), medium or metropolitan area networks (MANs), wide area networks (WANs) such as the Internet, cellular networks, satellite networks, virtual private networks (VPNs), or any combination of these or other networks. For example, a client device 102 may communicate with a server device via a wireless connection to a wireless access point on a LAN, which may communicate with a broadband modem, which may communicate with one or more switches and routers to a NAT gateway, which may communicate with the server device via a second LAN. Accordingly, additional intermediary devices 100 and networks 110 may be included.

In many implementations, server devices 104 may be associated with one or more domains 106A-106N (referred to generally as domain(s) 106). Domains 106 may comprise groups of one or more servers and/or IP addresses associated with a common identification string, sometimes referred to as a domain name, as part of the domain name system (DNS). A domain may refer to multiple servers at different destination addresses, such as where a plurality of application or data servers perform similar functions with a device (e.g. intermediary device 100) performing load balancing to support a plurality of client devices or servers. A single server with a single IP address may also be associated with a plurality of domains, such as where the server provides multiple functions (e.g. a web server and FTP server associated with different domain addresses). Thus, domains 106, IP addresses of servers, and applications provided by those servers frequently may not have a 1:1:1 correspondence.

In many implementations, it may be important to classify the first packet of a flow or communication, so that network paths may be properly selected and intermediary devices may be properly configured. For example, some decisions such as routing decisions may be made on the first packet of a flow in implementations in which it is very difficult to change the decision later (e.g. a firewall or network address translation device in the path might reset the connection if routing decisions are modified or a flow is misclassified). However, classifying packets may require deep packet inspection (DPI) or other analysis functions that may add significant latency to communications. This may result in long startup times for communications or transactions, frustrating users and delaying further processing tasks.

Figure 1B:
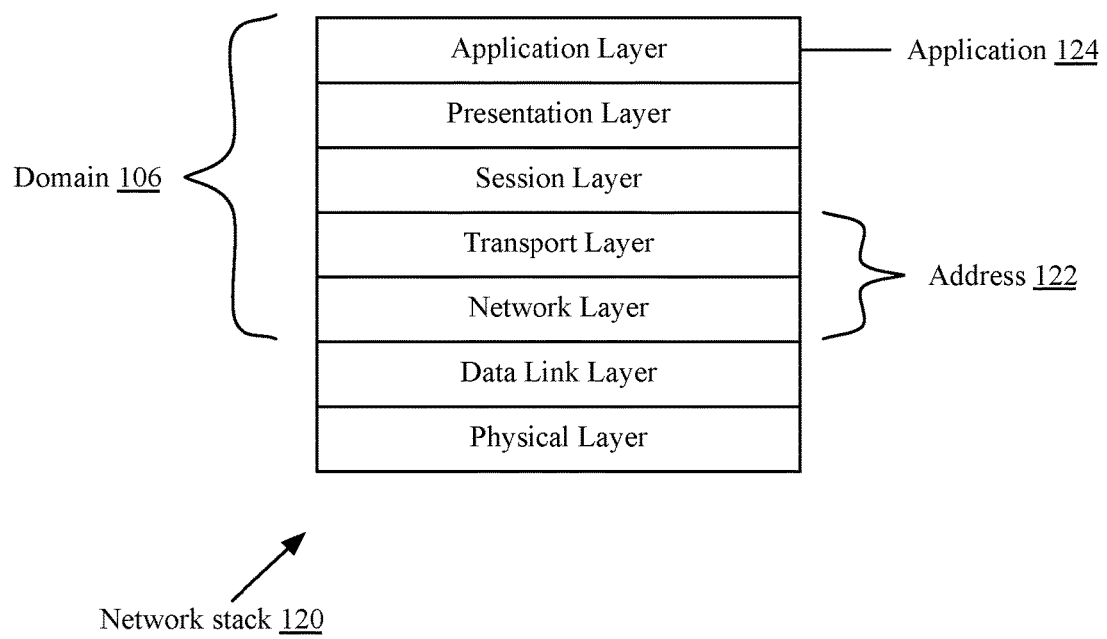
FIG. 1B is an illustration of an embodiment of a networking stack based on the open system interconnection (OSI) model.

Additionally, the first packet of a communication may include limited information (e.g. a transport control protocol synchronization packet (TCP SYN) which may not necessarily include a payload above OSI layer 4 (the transport layer)), making it difficult to identify applications. FIG. 1B is an illustration of an embodiment of a networking stack 120 based on the open system interconnection (OSI) model. As shown, the network stack includes multiple layers, from layer 1 (physical layer) through layer 7 (application layer). Packet headers at various layers of the network stack may provide different information, including identification of a destination IP address (at the network layer), destination port address (at the transport layer), and identification of an application 124 (at the application layer). In some implementations, applications may also be identified at other layers, such as a presentation layer application (e.g. remote desktop). Domains may be associated with different addresses at any layer. For example, a domain may be application or presentation layer related (e.g. "mail.example.com" or "remote.example.com") and associated with a specific socket, or network layer related (e.g. "example.com", associated with an IP address). Thus, receipt of a packet that includes no payload above the transport layer (e.g. a TCP SYN packet with no payload) may not provide sufficient information to identify a specific application.

Some attempts to address these deficiencies have included using a domain name service (DNS) lookup on the destination IP address to infer the application, such as a domain of mail.example.com for a mail server, or www.example.com for a web server. However, many IP addresses map to more than one application so accuracy can be low (e.g. a single server at example.com may provide many different services, including a secure shell (SSH) server, a mail server, a web server, a file transfer protocol (FTP) server, etc.). Furthermore, many domains may correspond to more than one IP address, particularly for scalable applications with multiple load balanced or high availability servers. Similarly, many applications use multiple servers and DNS names so a map of DNS names to applications must be maintained and kept up to date. Furthermore, DNS solutions do not allow for further application classification. For example, some web applications that provide online productivity suites may include word processing, spreadsheets, or presentation software, but all be accessed through a common domain.

Instead, the systems and methods discussed herein provide for low-latency application classification of first packets of flows, via an intelligent learning-based system. In one implementation, a packet processor may utilize destination internet protocol (IP) addresses and domains identified in first packets of flows to determine if a similar flow has been previously received, directed to the same address and domain. If not, then default routing and policy rules may be applied to the flow. The packet processor may subsequently fully classify the flow and generate a record in an association database for the combination of application, address, and domain, along with a starting confidence level or probability. Once fully classified, proper routing and policy rules may be applied. A subsequent flow for the same application, with the same destination IP address, may then be classified as the same as the prior flow, with the corresponding routing and policy rules applied. The packet processor may continue to fully classify the flow via deep packet inspection or similar methods, and upon full classification, the database entry may be updated with a success or failure to match, including adjusting the confidence level or probability that the entry is correct. Thus, to make an application based-decision on the first packet, a learning system calculates the probability that the first packet is part of a specific application. This may be particularly useful in instances where routing decisions are made based on the application, such as forwarding VoIP traffic at a remote cite via a branch internet connection while directing all other traffic to a central office or data center.

FIG. 1C is an illustration of an embodiment of an association database 150 for first packet application classification. Although shown as a table, in many implementations, association database 150 may be a flat file, relational database, set of parameter-value pairs, extensible markup language (XML) file, or any other type and form of data format. Each entry may include an address 122, such as an IP address. The address may include a port in some implementations, while in other implementations, ports may be omitted. In still other implementations, wildcards, ports, or port ranges may be included. For example, in some implementations, applications may be associated with a plurality of ports or a range of potential ports, and the server, client, or an intermediary device may select a port from within the range for use. In some such implementations, an entry may be associated with a range of ports, which may be consecutive (e.g. 1000-1500) or non-consecutive (e.g. even ports between 1000 and 1500; or 1000, 1100, 1200, etc.). Although shown in IPv4 format, addresses 122 may be in any format, including IPv6 and/or media access control (MAC) addresses. For example, in some implementations, an address 122 may comprise a layer 2 MAC address, layer 3 IP address, or layer 4 port, or any combination of these or other information.

Each entry may include a domain 106, which may comprise a DNS identifier corresponding to one or more addresses. Although shown as a top level or root domain, in many implementations, entries may include extended domains (e.g. mail.example.com; ftp.example.com; app.example.com/office/web; etc.). Domains may be ASCII or alphanumeric In some implementations, the association database 150 may comprise an index 152 for identifying entries. For example, in some implementations, index 152 for an entry may be calculated as the result of a hash calculation using inputs of an address 122 and domain 106. This may allow for quick and efficient lookup when receiving a first packet of a flow. In other implementations, the address or domain may be used as an index. For example, entries in the database may be indexed by destination address, allowing direct lookup.

Each entry in the association database 150 may have a corresponding application identifier 124. Application identifier 124 may identify any type and form of application or service, including application layer services, presentation layer services, session layer services, management services including lower layer management (e.g. neighbor discovery, simple network management protocols, etc.). In some implementations, applications 124 may be identified at various or multiple levels of granularity (e.g. IPv4/TCP/SMTP/email, IPv6/TCP/UDP/RTP/VoIP, etc.). Applications identifiers may be at high levels or identify end user functionality, such as email, video chat, streaming video, etc. or may identify protocols (e.g. SMTP, HLS, etc.) or both. Applications may correspond to routing and QoS policies or other processing policies. For example, a policy database (not illustrated) may include an entry identifying that flows associated with a mail application are to be given low priority, compressed, and encrypted; while another entry may identify that VoIP communications are to be given high priority or a highest QoS setting. In some implementations, different policies may be applied to the same application, but with different domains or addresses. For example, in one such implementation, a VoIP application 124 may be identified as an "internal" VoIP application for communications within an enterprise, and be given a first level of service; while a second VoIP application 124 may be identified as an "external" VoIP application for communications outside of the enterprise, and be blacklisted from communicating with certain IP ranges.

The association database may, in some implementations, include a confidence score or probability 154. Confidence score 154 may represent a statistical likelihood that a first packet having a particular address 122 and domain 106 should be classified as belonging to the corresponding application 124 in an entry in the database. Confidence scores 154 may be assigned starting at a default level (e.g. 50%, 20%, 80%, or any other such value) and may be dynamically adjusted by the intermediary device as flows are analyzed. For example, a first packet of a flow directed to a destination address of 1.2.3.4:80 and domain of example.com may be identified as potentially being HTTP or web browsing traffic, and corresponding policies may be applied to the flow. The intermediary device may continue to monitor the flow, including performing deep packet inspection on packet payloads. If the intermediary device identifies further web browsing traffic in the flow (e.g. HTTP GET requests, etc.), then the intermediary device may increase the confidence score 154 for the entry. Conversely, if the intermediary device identifies non-web browsing traffic, then the intermediary device may decrease the confidence score 154 for the entry. In some implementations, if the confidence score is below a particular threshold, then the corresponding routing policy may not be applied to the flow starting with the first packet; instead, a default routing policy may be applied. In a further implementation, if the confidence score is below a particular threshold (which may be the same, or a second, lower threshold), then the entry may be removed from the database, or the identified application may be replaced (and the confidence score potentially raised). For example, if after identifying non-web browsing traffic (e.g. instead identifying SSH traffic), and the corresponding score is reduced to some threshold, e.g. 20, then in some implementations, the intermediary device may replace the web server application identifier with an SSH application identifier and increase the score to a default value (e.g. 50). In this way, the intermediary device may dynamically adjust first packet application inferences, while providing some hysteresis in case of odd packet flows. In some implementations, the intermediary device may only adjust the confidence score if a packet flow is over a certain size or duration. This may prevent falsely adjusting scores in case of incorrectly addressed flows that are quickly terminated.

As the association database 150 grows and confidence scores 154 are increased, classification may become more accurate; accordingly, classification of greater amounts of flows may improve accuracy and efficiency. Thus, in some implementations, the association database 150 may be shared and aggregated with those of other intermediary devices throughout the enterprise, allowing faster capture of large amounts of traffic data. In some implementations, the association database 150 may even be shared outside the enterprise with trusted partners, or cached in a cloud service for access by other intermediary devices. In yet another implementation, the intermediary device may use DNS requests received from clients to further increase the accuracy of the cached classifications.

Figure 2A:
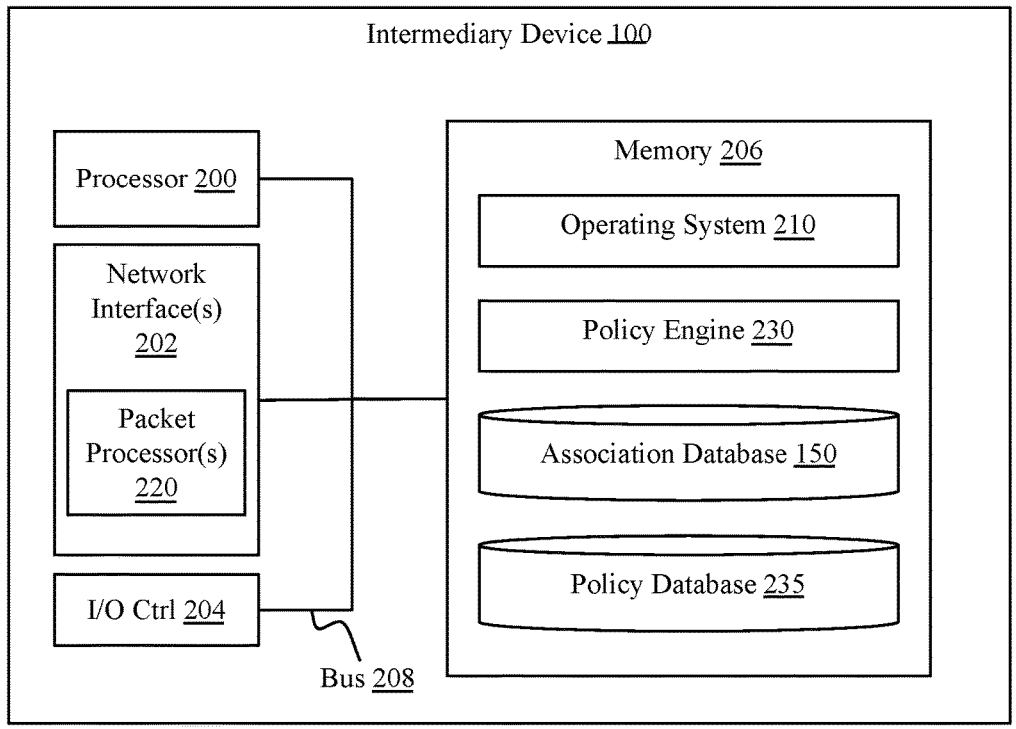
FIG. 2A is a block diagram of an embodiment of a computing device for first packet application classification.

FIG. 2A is a block diagram of an embodiment of a computing device 100 for first packet application classification. Such devices may include laptop computers, desktop computers, rackmount computers, tablet computers, wearable computers, appliances, cluster devices or appliances, server clouds or farms, virtual machines executed by one or more physical machines, or any other type of computing device. As shown in FIG. 2A, a computing device may include one or more central processing units or processors 200, one or more network interfaces 202, one or more input/output controllers or devices 204, one or more memory units 206 which may include system memory such as RAM as well as internal or external storage devices. A computing device may also include other units not illustrated including installation devices, display devices, keyboards, pointing devices such as a mouse, touch screen devices, or other such devices. Memory 206 may include, without limitation, an operating system 210 and/or software.

The central processing unit 200 is any logic circuitry that responds to and processes instructions fetched from the memory 206. In many embodiments, the central processing unit 200 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device may be based on any of these processors, or any other processor capable of operating as described herein, including, without limitation, graphics processing units (GPUs) and network processing units (NPUs).

Memory 206, sometimes referred to as a main memory unit, may be one or more memory chips capable of storing data and allowing any storage location to be directly accessed by the microprocessor 200, such as any type or variant of Static random access memory (SRAM), Dynamic random access memory (DRAM), Ferroelectric RAM (FRAM), NAND Flash, NOR Flash and Solid State Drives (SSD). The memory 206 may be based on any of the above described memory chips, or any other available memory chips capable of operating as described herein. In the embodiment shown, the processor 200 communicates with main memory 206 via a system bus 208 (described in more detail below). In other embodiments, the processor communicates directly with main memory 206 via a memory port. For example, in such embodiments, the memory 206 may be DRDRAM. In other embodiments, processor 200 may communicate directly with cache memory via a secondary bus, sometimes referred to as a backside bus. In other embodiments, the main processor 200 communicates with cache memory using the system bus 208. Cache memory typically has a faster response time than memory accessible via a system bus, and is provided by, for example, SRAM, BSRAM, or EDRAIVI.

In some embodiments, the processor 200 communicates with various I/O devices 204 via local system bus 208. Various buses may be used to connect the central processing unit 200 to any I/O devices, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 200 may use an Advanced Graphics Port (AGP) to communicate with the display. In some embodiments, the processor 200 may communicate directly with I/O devices, for example via HYPERTRANSPORT, RAPIDIO, or INFINIBAND communications technology. A wide variety of I/O devices may be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 204 as shown in FIG. 2A. The I/O controller may control one or more I/O devices such as a keyboard and a pointing device, e.g., a mouse or optical pen. Furthermore, an I/O device may also provide storage and/or an installation medium for the computing device. In still other embodiments, the computing device may provide USB connections (not shown) to receive handheld USB storage devices such as the USB Flash Drive line of devices manufactured by Twintech Industry, Inc. of Los Alamitos, Calif.

The computing device may support any suitable installation device (not illustrated), such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device may further include a storage device, such as one or more hard disk drives or redundant arrays of independent disks, for storing an operating system and other related software, and for storing application software programs such as any program or software for implementing (e.g., configured and/or designed for) the systems and methods described herein. Optionally, any of the installation devices could also be used as the storage device. Additionally, the operating system and the software can be run from a bootable medium.

Furthermore, the computing device may include a network interface 202 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device communicates with other computing devices via any type and/or form of gateway or tunneling protocol such as Secure Socket Layer (SSL) or Transport Layer Security (TLS). The network interface 202 may include a built-in network adapter, network interface card, PCMCIA network card, card bus network adapter, wireless network adapter, USB network adapter, modem or any other device suitable for interfacing the computing device to any type of network capable of communication and performing the operations described herein.

In some embodiments, the computing device may include or be connected to one or more display devices. As such, any I/O devices and/or the I/O controller 204 may include any type and/or form of suitable hardware, software, or combination of hardware and software to support, enable or provide for the connection and use of the display device(s) by the computing device. For example, the computing device may include any type and/or form of video adapter, video card, driver, and/or library to interface, communicate, connect or otherwise use the display device(s). In one embodiment, a video adapter may include multiple connectors to interface to the display device(s). In other embodiments, the computing device may include multiple video adapters, with each video adapter connected to the display device(s). In some embodiments, any portion of the operating system 210 of the computing device may be configured for using multiple displays. One ordinarily skilled in the art will recognize and appreciate the various ways and embodiments that a computing device may be configured to have one or more display devices.

In further embodiments, an I/O device may be a bridge between the system bus 208 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A computing device of the sort depicted in FIG. 2A may operate under the control of an operating system 210, which control scheduling of tasks and access to system resources. The client device or server can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8, or 10, produced by Microsoft Corporation of Redmond, Wash.; MAC OS and iOS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

As discussed above, the computing system can be any type and form of intermediary device, such as a router, gateway, switch, modem, load balancer, firewall, NAT device, WAN accelerator, security appliance, or any other type and/or form of computing, telecommunications or media device that is capable of receiving, processing, and transmitting packets. The computer system has sufficient processor power and memory capacity to perform the operations described herein. Although shown as a single device, in many implementations, intermediary devices 100 may be deployed in a cluster, cloud, farm, grid, mesh, or similar deployment scenario, providing scalability and reliability.

In some embodiments, the computing device may have different processors, operating systems, and input devices consistent with the device. For example, in one embodiment, the computing device is a smart phone, mobile device, tablet or personal digital assistant. In still other embodiments, the computing device is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device can be any workstation, desktop computer, laptop or notebook computer, server, handheld computer, mobile telephone, any other computer, or other form of computing or telecommunications device that is capable of communication and that has sufficient processor power and memory capacity to perform the operations described herein. Other software may be executed by the computing device, including web browsers, configuration applications, text editors or template editors, virtual machine servers, hypervisors, authentication or log-in agents, monitoring systems, or other such features.

Intermediary device 100 may include one or more packet processor(s) 220. Although shown as part of the network interface 202, in some implementations, packet processor(s) 220 may be executed by processor(s) 200, and may reside in memory 206. Packet processor(s) 220 may comprise hardware, such as ASIC circuitry; may comprise software, such as a driver within the network stack of an operating system 210 or executed by a coprocessor on a network interface; or may comprise any combination of hardware and software. Packet processor(s) 220 may be configured to receive, identify, classify, and transmit packets of a flow. Packet processor(s) 220 may maintain an association database 150, as discussed above, and may perform additional functionality according to a policy engine 230 and/or policy database 235, such as buffering, multiplexing, pooling, encrypting, compressing, re-ordering, pre-acking, retransmitting, applying QoS protocols, or any other type and form of processing. As discussed above, packet processor(s) 220 may select and apply routing policies according to an application identified for a combination of address and domain extracted from or identified in a first packet of a communication flow.

Policy engine 230 may be part of a packet processor 220 or may be separate from packet processor 220, as shown. In some implementations, policy engine 230 may comprise an application, service, server, daemon, routine, or other executable logic for configuring and/or applying routing policies stored in a policy database 235. Although referred to primarily as routing policies, in many implementations, policies may include additional instructions or parameters beyond routing instructions (e.g. encryption protocols, compression settings, buffering settings, QoS requirements, etc.); and in some implementations, may not include routing instructions. For example, although sometimes referred to as a routing policy, a policy may simply include QoS requirements, and routing may be left to standard network routing protocols. In this sense, routing may refer to a specific path through a network, or instructions for configuring any appropriate path through the network, or any combination of these. Policy database 235 may comprise any type and form of database, including a relational database, flat file, parameter-value pair set, XML file, or other data structure, any may comprise routing or configuration instructions and associated applications. In some implementations, policy database 235 may be part of application database 150; thus, each entry in the policy database 235 may also include corresponding routing or configuration instructions. In some implementations, applications may not be explicitly identified in such a combined association/policy database.

Figure 2B:
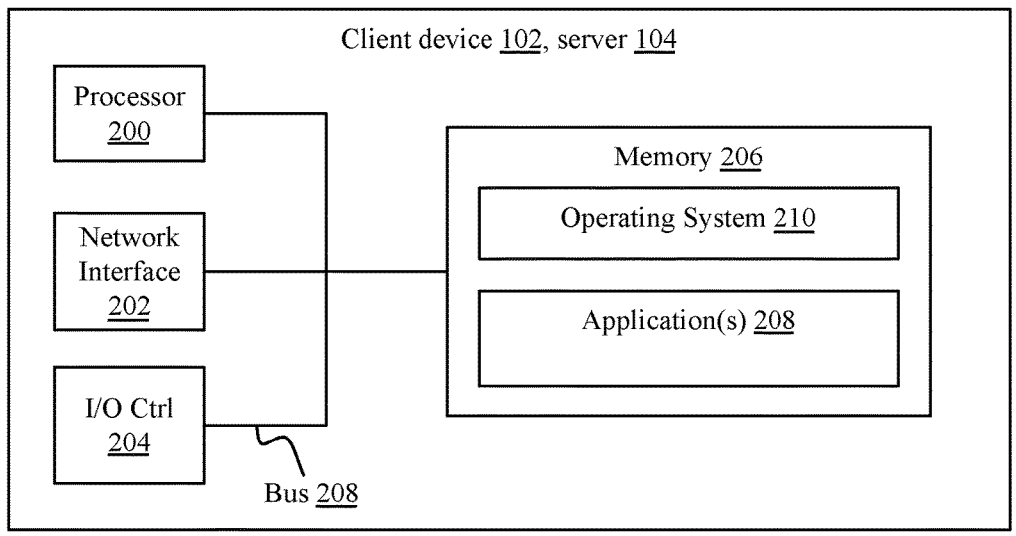
FIG. 2B is a block diagram of embodiments of a computing device for network communications.

FIG. 2B is a block diagram of embodiments of a computing device for network communications, such as a client device 102 and/or server 104. Client or server devices may include many of the components discussed above, including one or more processors 200, network interfaces 202, I/O controllers 204, memory devices 206, and an operating system 210. Additionally, client or server devices may comprise one or more applications 208. Applications 208 may comprise any type and form of applications, services, servers, daemons, or routines for performing various functions and/or communicating with other applications, either locally or remotely. Applications 208 may each comprise a plurality of files, including executable files, libraries, data files, parameter or preference files, registry keys, configuration files, graphics, audio files, video files, dictionaries, templates, or any other type and form of data. An application 208 may exist in a plurality of versions, and may be identified by a version number, name, or other indicator.

Figure 3:
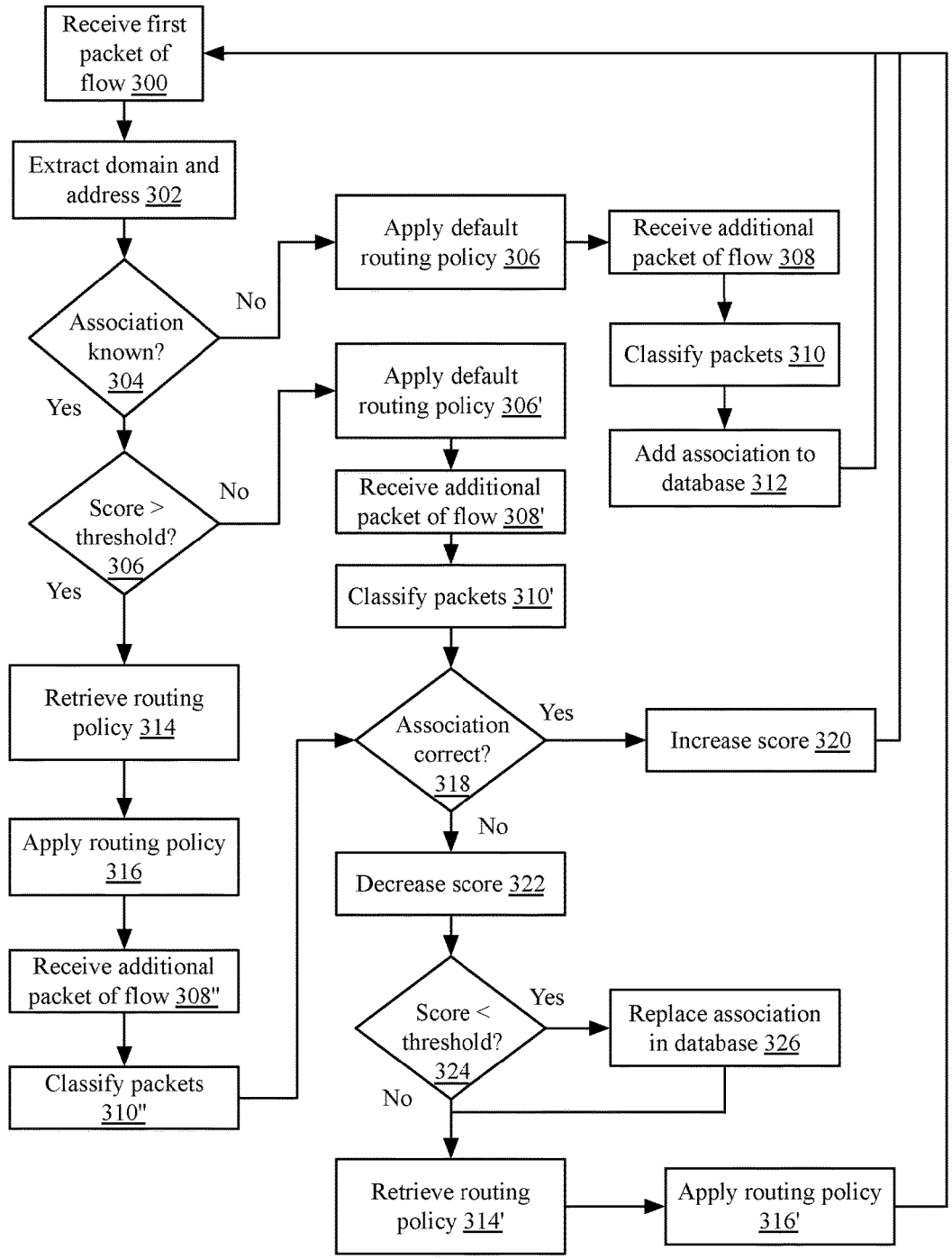
FIG. 3 is a flowchart of an embodiment of a method for first packet application classification.

FIG. 3 is a flowchart of an embodiment of a method for first packet application classification. At step 300, an intermediary device deployed between a first computing device and second computing device may receive a first packet of a communication flow between the first computing device and second computing devices. In many implementations, the first packet may comprise a synchronization packet, such as a TCP SYN packet, or similar connection establishment packet. In other implementations, the first packet may comprise a request, a trigger, or any other type and form of packet. The packet may or may not have an application layer payload.

At step 302, a packet processor of the intermediary device may identify or extract identifiers of a domain and destination address from the first packet. The destination address may comprise a network layer address, such as an IPv4 or IPv6 address. In some implementations, the destination address may comprise a transport layer address, such as a destination port number. In some implementations, the destination address may comprise a data layer address, such as a MAC address. In some implementations, any other portion of the header may be utilized, such as a protocol number or any other such identifier. The domain may be identified by a name in any appropriate format, including alphanumeric, ASCII, Unicode, or Punycode. The domain name may be extracted from a DNS request, a packet header, or any other portion of the packet. In some implementations, a DNS request and response may be communicated separately (e.g. before step 300), and the received domain name may be associated with the destination IP address, port, and/or protocol. In other implementations, the DNS request and response may be transmitted and received responsive to receipt of the first packet at step 300. The domain may be identified by matching the destination IP address, port, and/or protocol of the first packet with the IP address, port, and/or protocol corresponding to the domain received in the DNS response.

At step 304, the packet processor may determine if an association with an application exists for the extracted address and domain in an association database. Determining if the association exists may comprise looking up the address or the domain in the database, and determining whether a corresponding entry exists. In some implementations, determining if the association exists may comprise calculating a hash of the address, domain, port, and/or protocol or any combination of these, or applying a hashing algorithm to inputs of the address, domain, port, and/or protocol or any combination of these, and searching the database for an entry at an index corresponding to the hash result.

If an entry does not exist, then at step 306, the packet processor may apply a default routing policy to the communication flow. Applying the default routing policy may comprise applying default routing instructions, default load balancing procedures, etc. The packet may be forwarded to the destination in accordance with the default routing policy.

At step 308, in some implementations, the intermediary may receive an additional packet of the flow. The additional packet may comprise a response (e.g. in the other direction, from the second device to the first device) to the first packet, or may comprise an additional packet from the first device to the second device. At step 310, the packet processor may perform deep packet inspection to classify the flow, including inspecting application layer headers and/or payloads or headers or payloads at other layers, to identify the corresponding application. In some implementations, the packet processor may forward the additional packet in accordance with the default policy, and perform deep packet inspection on a copy of the additional packet. This may avoid delays in transmitting the additional packet. In a similar implementation, the first packet may have sufficient information to allow analysis. The packet processor may forward the first packet at step 306, and then perform deep packet inspection on a copy of the first packet at step 310, skipping step 308. This may similarly avoid delays in establishing the communication flow or transmitting the first packet.

At step 312, the packet processor may add an entry to the association database for the identified application, and address and domain. In some implementations, adding the entry may comprise calculating a hash of the address and domain and generating the entry at the corresponding index of the database. The packet processor may set a confidence score for the association to a default value.

In some implementations, where a routing policy exists for the identified application in a policy database, the packet processor may apply the corresponding policy instructions to the remainder of the flow, replacing the default policy. In other implementations in which updating the policy may break the communication flow (e.g. by causing other intermediary devices to reset the connection), the packet processor may remain applying the default policy to the flow.

If an association exists for the combination of address and domain at step 304, then at step 306, the packet processor may determine if an associated confidence score exceeds a threshold. If the score does not exceed the threshold, then the corresponding application classification may not be correct. Accordingly, the packet processor may apply the default routing policy to the flow at step 306', similar to step 306 discussed above. The packet processor may also receive additional packets of the flow at step 308' and classify the packets at step 310', as discussed above in connection with steps 308 and 310.

If the confidence score is greater than the threshold at step 306, then at step 314, the packet processor or a policy engine may retrieve a routing policy associated with the application identified in the entry corresponding to the address and domain. As discussed above, the routing policy may include network path specifications or parameters, packet processing parameters, or any other such instructions or configurations to be utilized in processing and forwarding packets for the corresponding application. At step 316, the packet processor may apply the policy, including modifying the packets if necessary, resetting packet queues, or performing any other such functions.

As discussed above, at step 308", the intermediary may receive additional packets of the flow, and may perform deep packet inspection at step 310", as discussed above in connection with steps 308 and 310. Also as discussed above, in some implementations, the packet processor may perform packet inspection at step 310" on a copy of the first packet, if it includes sufficient information to classify the flow.

At step 318, the packet processor may compare the classification of the flow at step 310' or 310" to the classification in the association database. If the application indicated in the database and the application identified via deep packet inspection are the same, then at step 320, the packet processor may increase the confidence score for the association. The confidence score may be increased by a predetermined amount, or according to a scaling formula (e.g. asymptotically approaching 100%, for example). Conversely, if the application indicated in the database and the application identified via deep packet inspection are not the same, then the confidence score may be decreased at step 322. The confidence score may be decreased by a predetermined amount, or according to a scaling formula. In some implementations, before decreasing the score, the packet processor may determine if the flow has reached a predetermined size or duration, and only decrease the score if the flow has reached such size or duration. As discussed above, this may avoid decreasing the score in case of erroneous transmissions that are quickly terminated.

At step 324, the packet processor may determine if the decreased score is below a second threshold. The second threshold may be lower than the threshold used at step 306, in some implementations. If the score is below the second threshold, then the association may be presumed to be generally incorrect. Accordingly, if so, at step 326, the packet processor may replace the application identified in the entry in the association database with an identifier of the new application identified at step 310' or 310". The packet processor may also reset the score to a default value, in some implementations. If the score is not yet below the second threshold, then processing may continue.

In some implementations, the flow may continue to be processed with the default routing policy or incorrectly applied routing policy after step 324 or step 326, to avoid unnecessarily resetting the connection. In other implementations, at step 314', the packet processor may retrieve the routing policy for the newly identified application from the policy database, as discussed above at step 314. Similarly, at step 316', the packet processor may apply the newly retrieved routing policy.

Accordingly, the method provides for quickly classifying packet flows based on characteristics extracted from the first packet, with associations that are dynamically adjusted based on confidence scores obtained based on the accuracy of the association over multiple flows. As discussed above, in many implementations, association databases may be shared and/or aggregated among many devices, resulting in more obtained data and classifications, and achieving accurate address-domain-application associations faster.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for processing packet flows, comprising:
    receiving, by a packet processor, a first packet of a first flow to a first destination address associated with a first domain;
    identifying, by the packet processor, a stored association between a first application, the first destination address, and the first domain;
    selecting, by the packet processor, a first routing policy corresponding to the first application from a plurality of routing policies, responsive to the identification of the stored association between the first application, the first destination address, and the first domain;
    processing, by the packet processor, the first packet of the first flow according to the selected first routing policy, responsive to the identification of the stored association between the first application, the first destination address, and the first domain; and
    adjusting a confidence score for the association between the first application, the first destination address, and the first domain, responsive to subsequently classifying the first flow as corresponding to either (i) the first application or (ii) a second application different from the first application.

2. The method of claim 1, further comprising:
    subsequently classifying the first flow as corresponding to the first application; and
    increasing a first confidence score for the association between the first application, the first destination address, and the first domain, responsive to classifying the first flow as corresponding to the first application.

3. The method of claim 1, further comprising:
    subsequently classifying the first flow as corresponding to the second application different from the first application; and
    processing the first flow according to a second routing policy corresponding to the second application.

4. The method of claim 3, further comprising:
    decreasing a first confidence score for the association between the first application, the first destination address, and the first domain, responsive to classifying the first flow as corresponding to the second application.

5. The method of claim 1, wherein selecting the first routing policy further comprises:
    determining that a first confidence score for the association between the first application, the first destination address, and the first domain exceeds a first threshold.

6. The method of claim 1, further comprising:
    prior to receipt of the first packet of the first flow:
        receiving, by the packet processor, a first packet of an earlier flow to the first destination address associated with the first domain;
        determining, by the packet processor, that no association exists in an application database with the first destination address and the first domain; and
        processing, by the packet processor, the first packet of the earlier flow according to a default routing policy, responsive to the determination that no association exists in the application database with the first destination address and the first domain.

7. The method of claim 6, further comprising:
    prior to receipt of the first packet of the first flow and after processing the first packet of the earlier flow according to the default routing policy:
        classifying, by the packet processor, the earlier flow as corresponding to the first application associated with the first routing policy different from the default routing policy; and
        storing, by the packet processor, the association between the first application, the first destination address, and the first domain, and storing a first confidence score for the association.

8. The method of claim 1, further comprising:
    receiving, by the packet processor, a first packet of a second flow to a second destination address associated with the first domain;

identifying, by the packet processor, a stored association between a second application, the second destination address, and the first domain;

selecting, by the packet processor, a second routing policy corresponding to the second application from the plurality of routing policies, responsive to the identification of the stored association between the second application, the second destination address, and the first domain; and processing, by the packet processor, the first packet of the second flow according to the selected second routing policy, responsive to the identification of the stored association between the second application, the second destination address, and the first domain.

9. The method of claim 1, wherein the first packet comprises an identification of a destination port and protocol; and wherein identifying the stored association further comprises identifying the stored association between the first application, the first destination address, the first domain, the destination port, and the protocol.

10. A method for maintaining a database of application-address-domain associations, comprising:

identifying a stored association between a first application, a first destination address, and a first domain, by a packet processor of a device, responsive to receipt of a first packet identifying the first destination address and first domain;

extracting an application identifier from the first packet, by the packet processor; and adjusting a confidence score for the association between the first application, the first destination address, and the first domain, by the packet processor, based on the extracted application identifier.

11. The method of claim 10, wherein adjusting the confidence score further comprises increasing the confidence score, by the packet processor, responsive to the extracted application identifier corresponding to the first application.

12. The method of claim 10, wherein adjusting the confidence score further comprises decreasing the confidence score, by the packet processor, responsive to the extracted application identifier corresponding to a second application different from the first application.

13. The method of claim 10, further comprising:

receiving, by the packet processor, a first packet of a subsequent flow to the first destination address associated with the first domain;

determining, by the packet processor, that the confidence score for the association between the first application, the first destination address, and the first domain is below a threshold; and processing, by the packet processor, the first packet of the subsequent flow according to a default routing policy, responsive to the determination.

14. A system for processing packet flows, comprising:

a packet processor deployed as an intermediary between a first device, and a second device at a first destination address and associated with a first domain; and a storage unit storing a database of associations between applications, destination addresses, and domains, and a confidence score for each said association;

wherein the packet processor is configured to:

receive, from the first device, a first packet of a first flow to the second device at the first destination address associated with the first domain, identify, in the database, a stored association between a first application, the first destination address, and the first domain, select a first routing policy corresponding to the first application from a plurality of routing policies, responsive to the identification of the stored association between the first application, the first destination address, and the first domain, process the first packet of the first flow according to the selected first routing policy, responsive to the identification of the stored association between the first application, the first destination address, and the first domain, and adjust a confidence score for the association between the first application, the first destination address, and the first domain, responsive to subsequently classifying the first flow as corresponding to either (i) the first application or (ii) a second application different from the first application.

15. The system of claim 14, wherein the packet processor is further configured to:

subsequently classify the first flow as corresponding to the first application; and increase a first confidence score for the association between the first application, the first destination address, and the first domain, responsive to classifying the first flow as corresponding to the first application.

16. The system of claim 14, wherein the packet processor is further configured to:

subsequently classify the first flow as corresponding to the second application different from the first application; and process the first flow according to a second routing policy corresponding to the second application.

17. The system of claim 16, wherein the packet processor is further configured to:

decrease a first confidence score for the association between the first application, the first destination address, and the first domain, responsive to classifying the first flow as corresponding to the second application.

18. The system of claim 14, wherein the packet processor is further configured to determine that a first confidence score for the association between the first application, the first destination address, and the first domain exceeds a first threshold; and wherein selecting the first routing policy is performed responsive to the determination.

19. The system of claim 14, wherein the packet processor is further configured to:

prior to receipt of the first packet of the first flow:

receive a first packet of an earlier flow to the first destination address associated with the first domain;

determine that no association exists in an application database with the first destination address and the first domain; and process the first packet of the earlier flow according to a default routing policy, responsive to the determination that no association exists in the application database with the first destination address and the first domain.

20. The system of claim 19, wherein the packet processor is further configured to:

prior to receipt of the first packet of the first flow and after processing the first packet of the earlier flow according to the default routing policy:

classify the earlier flow as corresponding to the first application associated with the first routing policy different from the default routing policy; and store, in the database, the association between the first application, the first destination address, and the first domain, and a first confidence score for the association.

21. The system of claim 14, wherein the packet processor is further configured to:
receive a first packet of a second flow to a second destination address associated with the first domain;
identify a stored association between a second application, the second destination address, and the first domain;
select a second routing policy corresponding to the second application from the plurality of routing policies, responsive to the identification of the stored association between the second application, the second destination address, and the first domain; and
process the first packet of the second flow according to the selected second routing policy, responsive to the identification of the stored association between the second application, the second destination address, and the first domain.

* * * * *